United States Patent

Nametkin et al.

[11] 4,278,774
[45] Jul. 14, 1981

[54] BLOCK-COPOLYMERS OF VINYLTRIALKYLSILANE-HEXAORGANOCYCLOTRISILOXANES AND METHOD FOR PRODUCING SAME

[76] Inventors: Nikolai S. Nametkin, Leninsky prospekt, 13, kv. 11; Sergei G. Durgarian, ulitsa Fersmana, 5, kv. 25; Eduard G. Novitsky, prospekt Mira, 120, kv. 218; Valentina G. Filippova, Shipilovskaya ulitsa, 23, kv. 37; Natalya K. Gladkova, Michurinsky prospekt, 54, korpus 3, kv. 85; Vladimir V. Teplyakov, Koptevskaya ulitsa, 18b, kv. 175, all of Moscow, U.S.S.R.

[21] Appl. No.: 12,451

[22] Filed: Feb. 15, 1979

[30] Foreign Application Priority Data

Feb. 20, 1978 [SU] U.S.S.R. ................. 2584574

[51] Int. Cl.³ ........................................... C08G 77/42
[52] U.S. Cl. ................................. 525/100; 525/477
[58] Field of Search ............... 260/825; 525/100, 477

[56] References Cited

U.S. PATENT DOCUMENTS 3,637,899  1/1972  Nametkin et al. ............... 260/827
4,080,400  3/1978  Martin ............................. 260/825

OTHER PUBLICATIONS

Polymer Preprints, vol. 10, No. 2, (1969), C. L. Lee et al., pp. 1361–1366.
Macromolecules, vol. 8, No. 5, (1975), J. G. Zilliox et al., pp. 573–578.
J. Polymer Science, vol. 3A, No. 1, (1965), R. P. Zelinski et al., pp. 93–103.
Carbanions, Living Polymers & Electron Transfer Processes, M. Szwarc, Interscience Publishers, New York, p. 34.
High-molecular Compounds, vol. XA, No. 10, (1968), N. S. Nametkin et al., pp. 2216–2222.

*Primary Examiner*—Wilbert J. Briggs, Sr.
*Attorney, Agent, or Firm*—Lackenbach, Lilling & Siegel

[57] ABSTRACT

Block-copolymers of vinyltrialkylsilane-hexaorganocyclotrisiloxane of the formula:

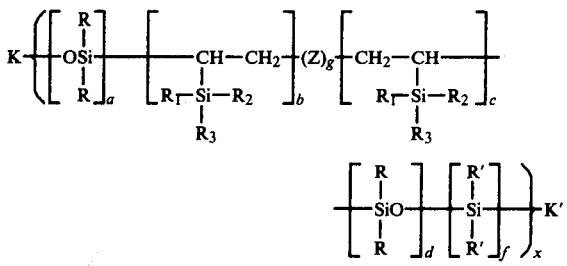

wherein R, R' are the same or different and each $R_3$ represent methyl, phenyl; $R_1$, $R_2$, $R_3$—are each an aliphatic radical containing 1 to 4 carbon atoms, Z is a residue of a dilithium initiator of polymerization of a vinyltrialkylsilane K is a residue of a monolithium initiator, which is a hydrocarbon radical- normal or iso-alkyl; K' is hydrogen, an ($R_3$) Si silcarbonic group wherein R is a $C_1$–$C_4$ alkyl radical, or a hydrocarbon radical; a=0 to $10^4$; b=0 to $10^4$; C=10 to $10^4$; d=10 to $10^4$; f=0 to 1; g=0 to 1, x≧1, with a molecular mass of from $10^3$ to $10^6$.

A method for preparing these block-copolymers comprises polymerization of vinyltrialkylsilanes in the presence of mono- or dilithiumorganic initiators, whereafter a solution of a hexaorganocyclotrisiloxane is added to the reaction mixture and polymerization is effected to give intermediate block-copolymers, whereafter the polymerization is stopped or the intermediate block-copolymers are combined by means of a cross-linking agent, followed by recovery of the desired product.

The block-copolymers according to the present invention feature a high selectivity of permeation for certain gases. Thus, the ratio of permeability constants for oxygen and nitrogen ($P_{O_2}/P_{N_2}$) is as high as 3.5. At the same time, the absolute value of gas-permeability constants is also high, i.e. $P_{O_2}$ is as high as $1.4 \times 10^{-8}$ cm³.cm/cm² cm Hg.sec.

11 Claims, No Drawings

BLOCK-COPOLYMERS OF VINYLTRIALKYLSILANE-HEXAORGANOCYCLOTRISILOXANES AND METHOD FOR PRODUCING SAME

The present invention relates to the art of high-molecular compounds and, more specifically, block-copolymers of vinyltrialkylsilanes-hexaorganocyclotrisiloxanes and to a method for producing same.

FIELD OF THE INVENTION

The present invention can be used, for example, in processes of enrichment and purification of various gas mixtures for different applications, primarily in the production of oxygen-enriched air. The use of such air is one of the most important factors in the intensification of different processes in metallurgy, chemistry, petrochemistry, microbiology and other industries.

BACKGROUND OF THE INVENTION

Polyvinyltrialkylsilanes are known to have a selective gas-permeability (cf. French Pat. No. 1,567,175, Int. Cl. B 01 d 53/22). However, despite a high selectivity, these polymers have an insufficient gas-permeability, for example relative to oxygen $P_{O_2} = 4.45 \times 10^{-9}$ cm$^3$cm/cm$^2$·cm Hg·sec). These polymers are produced by polymerization of vinyltrialkylsilanes in the presence of organolithium compounds (cf. USSR Inventor's Certificates Nos. 162,531 and 295,435, Int. Cl. C 08 f 130/08).

Known in the art are also polymers based on hexaorganocyclotrisiloxanes possessing high total gas-permeability. However, in certain cases these polymers have a low selectivity, for example with a gas mixture of oxygen and nitrogen ($P_{O_2}/P_{N_2} = 2.0-2.2$).

It is an object of the present invention to provide block-copolymers of vinyltrialkylsilanes-hexaorganocyclotrisiloxanes which have high total gas-permeability and high selectivity.

It is another object of the present invention to provide a method for producing block-copolymers of vinyltrialkylsilanes-hexaorganocyclotrisiloxanes.

SUMMARY OF THE INVENTION

These objects are accomplished by block-copolymers of vinyltrialkylsilane-hexaorganocyclotrisiloxane of the formula:

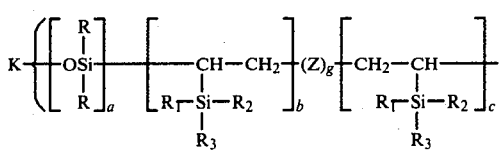

(I)

-continued

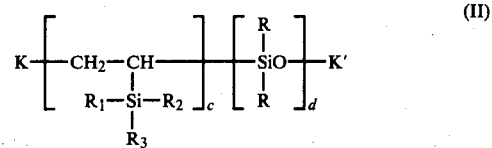

wherein R, R' are the same or different and each represent methyl, phenyl; R$_1$, R$_2$, R$_3$ are each an aliphatic radical containing 1 to 4 carbon atoms, Z is a residue of a dilithium initiator of polymerization of the vinyltrialkylsilane, K is a residue of a monolithium initiator which is a hydrocarbon radical, normal or iso-alkyl; K' is hydrogen, or a (R)$_3$Si silcarbanic group (wherein R is a C$_1$-C$_4$ alkyl radical), or a hydrocarbon radical, a=0 to 10$^4$; b=0 to 10$^4$; c=10-10$^4$; d=10-10$^4$; f=0-1; g=0-1; x is at least 1, with a molecular mass of from 10$^3$ to 10$^6$.

The synthesized block-copolymers according to the present invention feature a high selectivity of permeability for certain gases. Thus, the ratio between gas permeability constants for oxygen and nitrogen ($P_{O_2}/P_{N_2}$) is as high as 3.5 being only slightly inferior to the best component incorporated in the block-copolymer, i.e. polyvinyltrimethylsilane for which this ratio is equal to 4.5. At the same time, absolute values of gas-permeability constants of the block-copolymers according to the present invention are several times higher as compared to polyvinyltrimethylsilane (e.g., $P_{O_2}$ is as high as $1.4 \times 10^{-8}$ cm$^3$cm/cm$^2$·cm Hg.sec vs. $0.45 \times 10^{-8}$ for polyvinyltrimethylsilane).

An embodiment of the present invention resides in block-copolymers having the following structural formula:

$$K \left[ \begin{array}{c} CH_2-CH \\ | \\ R_1-Si-R_2 \\ | \\ R_3 \end{array} \right]_c \left[ \begin{array}{c} R \\ | \\ SiO \\ | \\ R \end{array} \right]_d K' \quad (II)$$

wherein R, R$_1$, R$_2$ and R$_3$ are as identified in the above formula (I), K is a residue of a monolithium initiator which is a hydrocarbon radical-a normal or iso-alkyl; K' is hydrogen, or a R$_3$Si silcarbanic group (wherein R is a C$_1$-C$_4$ alkyl radical) or a hydrocarbon radical.

Another embodiment of the present invention resides in block-copolymers having the following structural formula:

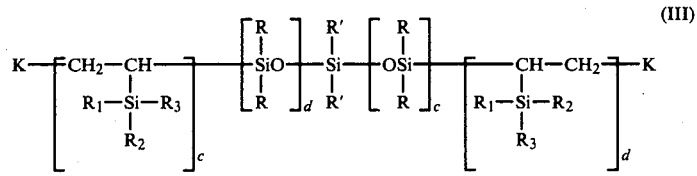

(III)

wherein R, R', R$_1$, R$_2$, R$_3$ are as identified in formula (I) hereinbefore, c=d=10 to 1,500; K is a hydrocarbon radical, normal or iso-alkyl.

Still another embodiment of the present invention resides in block-copolymers having the following structural formula:

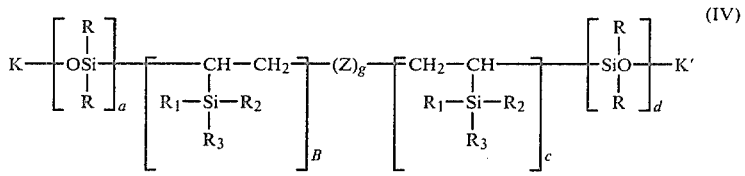

wherein R, $R_1$, $R_2$, $R_3$, c and d are as identified in formula (I) hereinbefore, $a=10-10^4$; $b=10-10^4$; $g=1$, K' is hydrogen, or a $R_3Si$ silcarbonic group (wherein R is $C_1$–$C_4$ alkyl radical) or a hydrocarbon radical.

A further embodiment of the present invention comprises block-copolymers having the following structural formula:

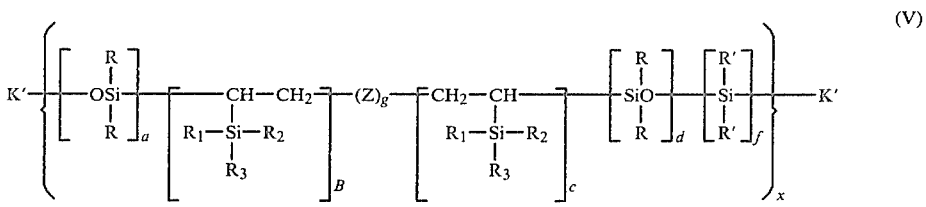

wherein R, R', $R_1$, $R_2$, $R_3$ are as identified in formula (I) hereinabove; K is hydrogen; $a=10-1,500$; $b=10-1,500$; $c=10-1,500$; $d=10-1,500$; $g=1$; $f=1$; x is above 1.

In accordance with the present invention it is advisable to produce block-copolymers of the general formula (I) by way of polymerization of a vinyltrialkylsilane in bulk or in a medium of a hydrocarbon solvent at a temperature within the range of from 0° to 80° C. in vacuum or in the atmosphere of an inert gas in the presence of a mono- or di-lithium organic initiator, followed by the addition of a hexaorganocyclotrisiloxane in a donor solvent and polymerization at a temperature within the range of from 20° to 60° C. in vacuum or in the atmosphere of an inert gas which polymerization is stopped or the resulting intermediate block-copolymer is treated with a compound of the formula $(R)_2SiX_2$, wherein R is methyl, phenyl; X is chlorine, acetoxy, followed by isolation of the final block-copolymer of formula (I).

In accordance with the present invention it is advisable, in the production of block-copolymers of the structural formula (II), to initially perform polymerization of vinyltrialkylsilanes in the presence of monolithium initiators in bulk or in a medium of a hydrocarbon solvent, with subsequent addition of a solution of a hexaorganocyclotrisiloxane in a medium of a donor solvent and then conduct polymerization of the second monomer. The polymerization is stopped and the final block-copolymer of the structural formula (II) is then recovered.

Furthermore, in accordance with the present invention it is also advisable, in the production of block-copolymers of the structural formula (III), to combine block-copolymers resulting after polymerization of the second monomer, by means of a cross-linking agent of the formula $(R)_2SiX_2$, wherein R is methyl, phenyl, X is chlorine, acetoxy.

It is also advisable, in accordance with the present invention, in the production of block-copolymers of the structural formula (IV), to initially perform polymerization of vinyltrialkylsilanes in the presence of metallic lithium or organodilithium compounds in bulk or in a medium of a hydrocarbon solvent, then to add a solution of a hexaorganocyclotrisiloxane in a medium of a donor solvent and, thereafter, to conduct polymerization of the second monomer with the formation of an intermediate block-copolymer; afterwards, the polymerization should be stopped and the final block-copolymer of the structural formula (IV) should be recovered.

In accordance with the present invention, it is advisable, in the production of block-copolymers of the structural formula (V), to combine the intermediate block-copolymers resulting from the production of the block-copolymers of the structural formula (IV) by means of a cross-linking agent of the formula: $(R)_2SiX_2$, wherein R is methyl, phenyl; X is chlorine, acetoxy.

Other objects and advantages of the present invention will now become more fully apparent from the following detailed description of block-copolymers of vinyltrialkylsilanes-hexaorganocyclotrisiloxanes, as well as a method for producing same, and specific examples given hereinbelow.

DETAILED DESCRIPTION OF THE INVENTION

The block copolymers according to the present invention comprise a combination of a polyvinyltrialkylsilane referred to hereinafter as block A and a polydiorganosiloxane referred to hereinafter as block B. Molecular weight of the block-copolymers according to the present invention is $10^3$ to $10^6$.

Combination of blocks A and B results in the formation of block-copolymers of different structures, e.g. of the type AB corresponding to the structural formula (II):

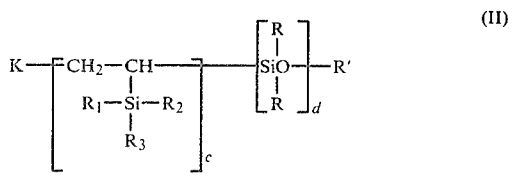

wherein R, $R_1$, $R_2$, $R_3$ are the same as in formula (I), K is a residue of a monolithium initiator which is a normal or isoalkyl hydrocarbon radical; K' is hydrogen, or a $R_3Si$ silcarbonic group (wherein R is a $C_1$–$C_4$ alkyl radical) or a normal or isoalkyl; of the type ABA corresponding to the structural formula (III):

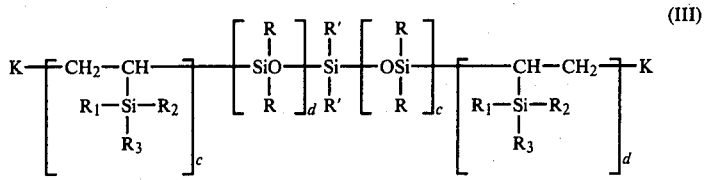

(III)

wherein R, R', R$_1$, R$_2$, R$_3$ are as identified in formula (I); c=d=10 to 1,500; at x=1, f=1 K is a normal or isoalkyl hydrocarbon radical;

of the BAB type corresponding to the structural formula IV:

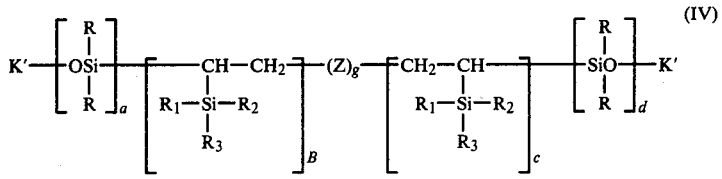

(IV)

wherein R, R$_1$, R$_2$, R$_3$ are as identified in formula (I); a=10 to 10$^4$; b=10 to 10$^4$; g=1; K' is hydrogen or a R$_3$Si group silcarbonic group (wherein R is a C$_1$-C$_4$ alkyl radical) or a normal or isoalkyl hydrocarbon radical;

of the (BAB)$_x$ type corresponding to the general formula V:

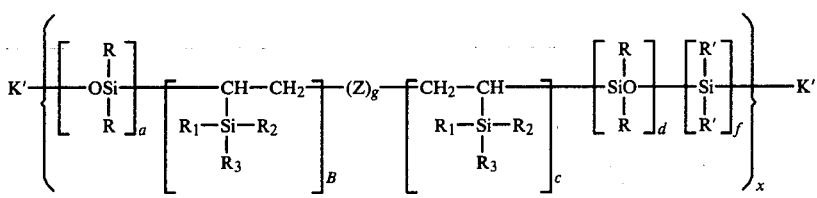

(V)

wherein R, R', R$_1$, R$_2$, R$_3$ are as identified in formula (I), K' is hydrogen; a=10 to 1,500; b=10 to 1,500; c=10 to 1,500; d=10 to 1,500; g=1; f=1, x is above 1.

As vinyltrialkylsilanes use can be made of the following monomers: vinyltrimethylsilane, vinyldimethylethylsilane, vinyldimethylpropylsilane, vinyldimethylbutylsilane, vinylmethyldiethylsilane, vinylmethyldipropylsilane, vinylmethyldibutylsilane, vinyltriethylsilane, vinyltripropylsilane, vinyltributylsilane.

As hexaorganocyclotrisiloxanes use can be made, for example, of hexamethylcyclotrisiloxane; 1-phenyl-1,3,3,5,5-pentamethylcyclotrisiloxane; 1,3,5-trimethyl-1,3,5-triphenylcyclotrisiloxane.

The process for the production of block-copolymers of the above-specified structural formulae should be preferably conducted in the presence of anionic initiators such as metallic lithium, lithium alkyls and organodilithium compounds.

Preparation of block A—polyvinyltrialkylsilane—is effected in bulk or in hydrocarbon solvents which are lower n-alkanes or iso-alkanes with a number of carbon atoms of from 5 to 10; aromatic, cycloaliphatic hydrocarbons, as well as mixtures thereof, for instance in hexane, benzene, toluene or mixtures thereof.

The initiator concentration can be varied within a wide range (of from 10$^{-1}$ to 10$^{-5}$ mole of the initiator per one mole of the vinyltrialkylsilane) depending on the required molecular weight according to the ratio M/C, wherein M is the number of moles of the monomer, C is the number of moles of the initiator. The polymerization temperature is within the range of from 0° to 80° C., preferably from 20° to 70° C. It is undesirable to conduct the polymerization process at a temperature beyond the above-specified range, since with decreasing temperature the reaction rate is lowered, while with increasing temperature the role of side reactions becomes more important.

Preparation of the second block B-polydiorganosiloxane is effected in solvents having Lewis base characteristics. Among such preferred solvents are oxygen-containing solvents such as tetrahydrofuran, tetrahydropyran, diethoxyethane, diethylene glycol dimethyl ether, diethylene glycol diethyl ether, dioxane and the like. Polymerization of hexaorganocyclotrisiloxanes is conducted preferably at a temperature within the range of from 20° to 60° C., though the use of higher or lower temperatures is also possible.

The process of block-copolymerization is conducted either in vacuum, or in the atmosphere of a dry and purified inert gas under stirring.

Block-copolymers of the types AB and BAB are prepared by successively adding the monomers; block-copolymers of the type ABA and (BAB)$_x$ are prepared only with the use of cross-linking agents, since the terminal silanolate group of the "living" polydiorganosiloxane does not initiate polymerization of vinyltrialkylsilanes.

In the preparation of block-copolymers of the type AB or BAB, the process is conducted in the following manner. In the first stage the polymerization of vinyltrialkylsilanes is initiated by means of mon- or di-lithium organic compound to give a polyvinyltrialkylsilane block (A) having accordingly at one end or both ends thereof lithium ions, or a so-called "living" polymer. Duration of this stage is defined by the temperature and degree of polymerization which should be achieved at this stage.

In the second stage, there is added a hexaorganocyclotrisiloxane, for example hexamethylcyclotrisiloxane in a solution of an oxygen-containing solvent such as tetrahydrofuran and a further growing of the polymer chain occurs on polymeric carbanions of block A. In this manner, there are obtained block-copolymers of the type ABLi or LiBABLi, in the latter case polymerization of vinyltrialkylsilanes is conducted in the presence of a dilithium initiator. Duration of the second stage is also determined by the temperature and degree of polymerization which is to be achieved at this stage. When a certain degree of polymerization of a hexaorganocyclotrisiloxane is achieved, the process is stopped. Water alcohols, haloalkyls, trialkylchlorosilanes) and block-copolymers of the type AB and BAB are recovered by conventional methods, using various solvents and precipitation agents.

In the synthesis of block-copolymers of the type ABA or $(BAB)_x$ the third stage of the process is combination of intermediate block-copolymers ABLi or LiBABLi by means of a cross-linking agent with the use of block-copolymers corresponding to the structural formulae II or IV. As the cross-linking agents use can be made of bifunctional organosilicone compounds of the type $(R)_2SiX_2$, wherein X is chlorine or acetoxy, R is methyl, phenyl or methyl and phenyl at the same time. These compounds can be exemplified by dimethyldichlorosilane, methylphenyldichlorosilane, dimethyldiacetoxysilane, diphenyldiacetoxysilane.

Maximum efficiency of the bifunctional compound is attained by introducing lithium ions in stoichiometric amounts.

Cross-linking of intermediate blocks AB or BAB can be effected in another manner. First of all, the terminal-SiOLi groups are converted to-SiOH groups by treatment of the polymer solution with acetic acid. Thereafter, condensation of the blocks containing terminal-SiOH groups is effected in the presence of organic salts of tin, e.g. tin octanoate.

The resulting block-copolymers are recovered by conventional techniques.

The above-described procedure has been employed to obtain block-copolymers containing 1 to 99% by weight of siloxane units. Block-copolymers of vinyltrialkylsilanes-hexaorganocyclotrisoloxanes are very soluble in various organic solvents such as toluene, benzene, hexane, heptane, cyclohexane, methylcyclohexane, chlorobenzene, tetrahydrofuran and the like. Said block-copolymers have a high gas-permeability with respect to different gases: hydrogen, argon, helium, oxygen, nitrogen, carbon dioxide and the like.

The block-copolymers according to the present invention can be subjected to control of the composition and structure thereof by different physico-chemical methods including spectrography, nuclear-magnetic resonance, gas-permeability measurements and the like.

EXAMPLE 1

A block-copolymer of vinyltrimethylsilane-hexamethylcyclotrisiloxane of the type AB corresponding to the structural formula (II), wherein $R=R_1=R_2=R_3=CH_3$, $K'=CH_3$,

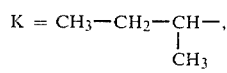

c is about 1,300; d is about 1,700 is prepared in the following manner.

Into a glass reactor set under vacuum of $10^{-3}$ mm Hg there is charged in vacuum a weighed portion of 48.3 g (0.483 mole) of vinyltrimethylsilane and 0.0029 g ($0.45 \times 10^{-4}$ mole) of sec. butyllithium. The reactor is sealed-off and placed into a thermostat at a temperature of 35° C. Polymerization of block A (polyvinyltrimethylsilane) is conducted for seven hours; under these conditions the yield of polyvinyltrimethylsilane (PVTMS) is 19% by weight and the reaction mass is still mobile. Thereafter, to the resulting "living" chains of polyvinyltrimethylsilane ($[\eta]=0.52$ dl/g, toluene, 25° C.; $\overline{M}_w=170,000$ -$M_w$-weight average molecular weight, in all other cases viscosity is measured in toluene) after breaking the glass membrane there are added 13 g (0.058 mole) of hexamethylcyclotrisiloxane in 40 ml of toluene and 70 ml of tetrahydrofuran; the reactor is then placed into a thermostat at a temperature of 35° C. for 14 hours. Polymerization is stopped by the addition of 10 ml of methyl iodide in 40 ml of benzene.

The resulting block-copolymer of the type AB is dissolved in toluene and reprecipitated in a 10-fold excess of methanol, whereafter the copolymer is filtered-off and dried to constant weight.

Intrinsic viscosity of the block-copolymer $[\eta]=0.88$ dl/g.

| Elemental composition of the block- | | | | |
|---|---|---|---|---|
| copolymer, %: | | C | H | Si |
| Found | | 46.3 | 10.0 | 32.9 |
| IR-spectrum, $\nu$ cm$^{-1}$: | 1,247; 818, 676 [—Si(CH$_3$)$_3$], | | | |
| | 1,045; [Si—O—Si] 450 | | | |
| | 1,250; 800 (Si—CH$_3$). | | | |
| Block-copolymer composition, by weight: | | | | |
| polyvinyltrimethylsilane block | | 50% | | |
| polydimethylsiloxane block | | 50%. | | |

This block-copolymer has the following gas-permeability constants expressed in cm$^3$·cm/cm$^2$·cm Hg·sec for different gases:

| $P_{N_2}$ | $P_{O_2}$ | $P_{He}$ | $P_{Ar}$ | $P_{O_2}/P_{N_2}$ |
|---|---|---|---|---|
| $0.39 \times 10^{-8}$ | $1.17 \times 10^{-8}$ | $1.80 \times 10^{-8}$ | $0.92 \times 10^{-8}$ | 3.0 |

EXAMPLE 2

A block-copolymer of vinyltrimethylsilane-hexamethylcyclotrisiloxane of the type BAB corresponding to the structural formula IV, wherein $R=R_1=R_2=R_3=CH_3$, K' is hydrogen, $Z=C_{10}H_8$, b+c is about 5,500; a+d is about 4,000; g=1, is prepared in the following manner.

Into a glass reactor set under vacuum of $10^{-3}$ mm Hg and provided with a stirrer there is charged in vacuum a weighed portion of 20 g (0.2 mole) of vinyltrimethylsilane and $1.0 \times 10^{-5}$ mole ($14.2 \times 10^{-4}$) g of dilithium-naphthalene in a solution of tetrahydrofuran. The reactor is sealed-off from the vacuum source and placed in a thermostat at a temperature of 65° C. Polymerization is conducted under stirring for 6 hours; under these conditions the yield of PVTMS is 11% by weight and the reaction mass is well stirred. Then to the resulting "living" chains of polyvinyltrimethylsilane ($[\eta]=1.5$ dl/g; $\overline{M}_v=1,000,000$-$M_v$-Viscosity average molecular weight) there are added 4.5 g (0.02 mole) of hexamethylcyclotrisiloxane in 30 ml of xylene and 30 ml of tetrahydrofuran; the reactor is sealed-off from the vacuum source and polymerization of hexamethylcyclotrisiloxane is conducted at a temperature of 60° C. to 4.0 hours. The resulting block-copolymer is recovered following the procedure described in the foregoing Example 1.

Intrinsic viscosity of the thus-produced block-copolymer is $[\eta]=2.5$ dl/g.

| Elemental composition, %: | C | H | Si |
|---|---|---|---|
| Found | 50.0 | 10.7 | 31.4 |
| IR-spectrum, $\nu$ cm$^{-1}$: | 1,247; 818; 676; [Si—(CH$_3$)$_3$]; 1,045; 450 (Si—O—Si); 1,258; 800 (Si—CH$_3$). | | |
| Block-copolymer composition: | | | |
| polyvinyltrimethylsilane block | 65% by weight | | |
| polydimethylsiloxane block | 35% by weight. | | |

EXAMPLE 3

Block-copolymer of vinyltrimethylsilane-hexamethylcyclotrisiloxane of the type (BAB)$_x$ corresponding to the structural formula V, wherein $R=R_1=R_2=R_3=CH_3$, K' is hydrogen, R' is C$_6$H$_5$, Z=C$_{10}$H$_8$, g=1, f=1; x=2; b+c is about 600, a+d is about 600, is prepared in the following manner.

Into a glass reactor set under vacuum of 10$^{-3}$ mm Hg and provided with a stirrer there is added in vacuum a weighed portion of 23.5 g (0.235 mole) of vinyltrimethylsilane and $2.4 \times 10^{-2}$ g ($1.7 \times 10^{-4}$ mole) of dilithiumnaphthalene in a solution of tetrahydrofuran. The reactor is sealed-off from the vacuum source and placed into a thermostat at a temperature of 75° C. Polymerization is conducted under stirring for 40 hours; under these conditions the yield of PVTMS is 27.5% by weight and the reaction mass is well stirred. Thereafter, to the resulting "living" chains of polyvinyltrimethylsilane ($[\eta]=0.37$; $\overline{M}_\nu=100,000$-$M_\nu$-viscosity overage molecular weight) there are added 5.0 g (0.0225 mole) of hexamethylcyclotrisiloxane in 20 ml of xylene and 25 ml of tetrahydrofuran; the reactor is sealed-off from the vacuum source and polymerization of hexamethylcyclotrisiloxane is conducted at the temperature of 80° C. for three hours.

Intrinsic viscosity of the resulting block-copolymer BAB is $[\eta]=0.6$ dl/g. Then the block-copolymer solution is added with 0.05 g ($1.7 \times 10^{-4}$ mole) of diacetoxydiphenylsilane in a solutiion of benzene (0.09 N solution), whereafter the polymer solution is stirred for 24 hours at a temperature of 45°–50° C. The block-copolymer (BAB)$_x$ is recovered by a conventional method. The product is a white solid compound with the intrinsic viscosity in toluene at a temperature of 25° equal to 0.7 dl/g.

| Elemental composition, %: | C | H | Si |
|---|---|---|---|
| Found | 49.1 | 10.3 | 32.1 |
| IR-spectrum, $\nu$ cm$^{-1}$: | 1,247; 818; 676 [Si(CH$_3$)$_3$], 1,045; 450 (Si—O—Si), 1,258; 800 (Si—CH$_3$). | | |
| Composition of the block copolymer: | | | |
| polyvinyltrimethylsilane block | 58% by weight | | |
| polydimethylsiloxane block | 42% by weight. | | |

The following are gas-permeability constants of the resulting block-copolymer expressed in cm$^3$·cm/cm$^2$·cm Hg·sec for different gases:

| $P_{O_2}$ | $P_{N_2}$ | $P_{CO_2}$ | $P_{O_2}/P_{N_2}$ |
|---|---|---|---|
| $1.4 \times 10^{-8}$ | $0.50 \times 10^{-8}$ | $9.3 \times 10^{-8}$ | 2.80 |

EXAMPLE 4

A block-copolymer of vinyldimethylpropylsilane-1,3,5-trimethyl-1,3,5-triphenylcyclotrisiloxane of the type BAB corresponding to the structural formula IV, wherein $R_1=R_2=CH_3$, $R_3=C_3H_7$, $R=CH_3$ and C$_6$H$_5$ (I:I), K' is hydrogen, Z=C$_{10}$H$_8$; g=1, b+c is about 200, a+d is about 500, is prepared in the following manner.

Into a glass reactor provided with a stirrer and set under vacuum of 10$^{-3}$ mm Hg there is added in vacuum a weighed portion of 20.7 g (0.162 mole) of vinyldimethylpropylsilane and $2.8 \times 10^{-2}$ g ($2.0 \times 10^{-4}$ mole) of dilithiumnaphthalene in a solution of tetrahydrofuran. The reactor is sealed-off from the vacuum source and placed in a thermostat at a temperature of 10° C. Polymerization is conducted under stirring at this temperature for 20 hours. Under these conditions the yield of block A is 15.0% by weight and the reaction mass is well stirred. Thereafter, to the resulting "living" chains of polyvinyldimethylpropylsilane ($[\eta]=0.25$; $\overline{M}_\nu=52,000$) there are added 8.0 g (0.02 mole) of 1,3,5-trimethyl-1,3,5-triphenylcyclotrisiloxane in 30 ml of xylene and 25 ml of tetrahydrofuran; the reactor is sealed-off from the vacuum source and polymerization of 1,3,5-trimethyl-1,3,5-triphenylcyclosiloxane is conducted at a temperature of 20° C. for 25 hours.

The block-copolymer is recovered following the procedure described in the foregoing Example 1. Intrinsic viscosity of the resulting block-copolymer of the BAB type is $[\eta]=0.6$ dl/g.

| Elemental composition, %: | C | H | Si |
|---|---|---|---|
| Found | 62.8 | 8.1 | 20.8 |
| IR-spectrum, $\nu$ cm$^{-1}$: | 1,259; 814 [—Si(CH$_3$)$_3$], 1,045; 445; (Si—O—Si), 1,420; 1,100 (Si—C$_6$H$_5$), 1,380 (C—CH$_3$). | | |
| Composition of the block-copolymer: | | | |
| polyvinyldimethylpropylsilane block | 30% by weight | | |
| polymethylphenylsiloxane block | 70% by weight | | |

Selectivity of the block copolymer relative to the pair O$_2$, N$_2$·$P_{O_2}/P_{N_2}=3.1$.

EXAMPLE 5

A block-copolymer of vinyltrimethylsilane and 1-phenyl-1,3,3,5,5-pentamethylcyclotrisiloxane of the type (BAB)$_x$ corresponding to the structural formula I, wherein $R'=R_1=R_2=R_3=CH_3$; $R=CH_3$ and C$_6$H$_5$ (5:1), K' is hydrogen; Z=C$_{10}$H$_8$; f=1, g=1, X=2, b+c is about 400; a+d is about 100, is produced in the following manner.

Into a glass reactor provided with a stirrer and set under vacuum of 10$^{-3}$ mm Hg, there is added a weighed portion of 20.7 g (0.207 mole) of vinyltrimethylsilane and $5.4 \times 10^{-2}$ g ($3.0 \times 10^{-4}$ mole) of dilithiumnaphthalene in a solution of tetrahydrofuran. The reactor is sealed-off from the source of vacuum and placed into a thermostat at a temperature of 25° C. Polymerization is conducted under stirring for 30 hours; under these conditions the yield of PVTMS is 34.5% by weight and the reaction mass is well stirred. Thereafter, to the resulting "living" chains of polyvinyltrimethylsilane ($[\eta]$)=0.30, $\overline{M}_v$=75,000) there are added 3.0 g (0.0108 mole) of 1-phenyl-1,3,3,5,5-pentamethylcyclotrisiloxane in 15 ml of xylene and 20 ml of tetrahydrofuran; the reactor is sealed-off from the vacuum source and polymerization of 1-phenyl-1,3,3,5,5-pentamethylcyclotrisiloxane is conducted for six hours at a temperature of 40° C. Intrinsic Viscosity of the resulting block-copolymer of the BAB type is $[\eta]$=0.36 dl/g. Then the solution of the block-copolymer is added with 0.04 g ($3.0\times10^{-4}$ mole) of dimethyldichlorosilane in a solution of benzene; thereafter, the polymer solution is stirred for 24 hours at a temperature of 45°–50°.

The block-copolymer of the type $(BAB)_x$ is recovered by a conventional technique; the product is a white powder with an intrinsic viscosity in toluene at a temperature of 25° C. of 0.55 dl/g.

| Elemental composition, %: | C | H | Si |
|---|---|---|---|
| Found | 57.5 | 11.3 | 28.3 |
| IR-spectrum, $\nu$ cm$^{-1}$: | 1,247; 818; 676 [—Si(CH$_3$)$_3$], 1,045; 445 (Si—O—Si), 1,258; 805 (Si—CH$_3$), 1,428; 1,090 (Si—C$_6$H$_5$). | | |
| Composition of the block-copolymer: | | | |
| polyvinyltrimethylsilane block | 80% by weight | | |
| polymethylphenylsiloxane block | 20% by weight. | | |

Given hereinbelow are constants of gas-permeability of the resulting block-copolymer expressed in cm$^3$·cm/cm$^2$·cm Hg·sec for various gases:

| $P_{O2}$ | $P_{N2}$ | $P_{CO2}$ | $P_{O2}/P_{N2}$ |
|---|---|---|---|
| 0.703 × 10$^{-8}$ | 0.213 × 10$^{-8}$ | 4.3 × 10$^{-8}$ | 3.3 |

EXAMPLE 6

A block-copolymer of vinylmethyldibutylsilane-1,3,5-trimethyl-1,3,5-triphenylcyclotrisiloxane of the type AB corresponding to the structural formula II, wherein R$_1$ is CH$_3$, R$_2$=R$_3$=C$_4$H$_9$, R=CH$_3$ and C$_6$H$_5$ (1:1), K=n—C$_4$H$_9$, K' is hydrogen, c is about 5, d is about 4, is produced in the following manner.

Into a glass reactor provided with a stirrer and filled with dry purified nitrogen, in a current of nitrogen there is added a weighed portion of 18.4 g (0.10 mole) of vinylmethylbutylsilane in 17 ml of cyclohexane and 3.20 g (0.05 mole) of n-butyllithium in a solution of cyclohexane. Polymerization is conducted under stirring at a temperature of 60° C. for 60 hours; under these conditions the yield of block A is 80% and the reaction mass is still well stirred. Thereafter, to the resulting "living" chains of polyvinylmethyldibutylsilane ($\overline{M}_n$=1,000-M$_n$-number-overage molecular weight) there are added 6.0 g (0.015 mole) of 1,3,5-trimethyl-1,3,5-triphenylcyclotrisiloxane in 20 ml of xylene and 25 ml of tetrahydrofuran; polymerization is conducted at a temperature of 25° C. for 9 hours. The block-copolymer is recovered by a conventional method. The resulting block-copolymer has $\overline{M}_n$=1,500.

| Elemental composition, %: | C | H | Si |
|---|---|---|---|
| Found | 68.1 | 11.5 | 16.5 |
| IR-spectrum, $\nu$ cm$^{-1}$: | 1,258; 810; (Si—CH$_3$), 1,420; 1,100; (Si—C$_6$H$_5$), 1.045; 445 (Si—O—Si), 1,380 (C—CH$_3$). | | |
| Composition of the block-copolymer: | | | |
| polyvinylmethyldibutylsilane block | 74% by weight | | |
| polymethylphenylsiloxane block | 26% by weight. | | |

EXAMPLE 7

A block-copolymer of vinyltrimethylsilane-hexamethylcyclotrisiloxane of the type ABA corresponding to the structural formula III is prepared in the presence of sec.butyllithium with the use of a cross-linking agent, i.e. tin octanoate; R=R$_1$=R$_2$=R$_3$=CH$_3$, K—n—C$_4$H$_9$, c is about 1,700 d is about 400.

Into a glass reactor set under vacuum of 10$^{-3}$ mm Hg there is added in vacuum a weighed portion of 41.4 g (0.414 mole) of vinyltrimethylsilane and 0.0025 g (0.40×10$^{-4}$ mole) of sec.butyllithium in a solution of benzene. The reactor is sealed-off from the vacuum source and placed into a thermostat at a temperature of 15° C. Polymerization is conducted under stirring for 50 hours. Conversion of vinyltrimethylsilane is 18%. ($[\eta]$=0.60 dl/g. $\overline{M}_v$=220,000). Thereafter, to "living" chains of PVTMS after breaking the partitioning membrane there are added 6.9 g (0.03 mole) of hexamethylcyclotrisiloxane in 20 ml of toluene and 40 ml of tetrahydrofuran. The reactor is placed in a thermostat at a temperature of 35° C. Polymerization is stopped when a 25% conversion of hexamethylcyclotrisiloxane is attained after 2 hours by the addition of a 10% acetic acid; the terminal groups are converted to —OH groups. The polymer solution is washed with a 3% aqueous solution of sodium bicarbonate until neutral reaction and treated with a 10-fold excess of methanol. The resulting polymer ($[\eta]$=0.75) is dissolved in toluene (a 5–7% solution), added with 3–5% (by weight of the polymer) of tin octanoate and stirred in a flask provided with a reflux condenser at a temperature of 80° C. for 10 to 12 hours. On completion of the cross-linking reaction the polymer is recovered by a conventional method.

The resulting polymer has an intrinsic viscosity of 0.97 dl/g.

| Composition of the block-copolymer by weight: | |
|---|---|
| polyvinyltrimethylsilane block | 85% |
| polydimethylsiloxane block | 15%. |

The resulting block has the following gas-permeability constants (measure units are the same as in Example 1):

| $P_{N2}$ | $P_{H2}$ | $P_{O2}$ | $P_{O2}/P_{N2}$ |
|---|---|---|---|
| 0.198 × 10$^{-8}$ | 3.22 × 10$^{-8}$ | 0.70 × 10$^{-8}$ | 3.5. |

EXAMPLE 8

A block-copolymer of vinyldimethylethylsilane and hexamethylcyclotrisiloxane of the type BAB is prepared in the presence of metallic lithium; R=R$_1$=R$_2$=CH$_3$; R$_3$=C$_2$H$_5$; K'=CH$_3$; b+c is about 40; a+d is about 600; g=0.

Into a glass reactor provided with a stirrer and filled with dry and purified argon there are placed 100 g (0.45 mole) of hexamethylcyclotrisiloxane in 150 ml of xylene and 50 ml of diethylene glycol dimethyl ether; thereafter in a current of argon there are added 5 ml of a solution of dilithium polyvinyldimethylethylsilane ($M_n=4,000$; concentration $^C$"living chains"$=0.5\times10$ mol./ml) prepared by interaction of vinyldimethylethylsilane and metallic lithium in a solution of benzene. Block-copolymerization is conducted for 5 hours at a temperature of 60° C. The block-copolymer is recovered following the procedure of Example 1 hereinbefore. Intrinsic viscosity of the resulting block-copolymer is $[\eta]=1.08$ dl/g.

| Block-copolymer composition: | |
|---|---|
| polyvinyldimethylethylsilane block | 1% by weight |
| polydimethylsiloxane block | 99% by weight. |

EXAMPLE 9

A block-copolymer of vinyltripropylsilane and 1-phenyl-1,3,3,5,5-pentamethylcyclotrisiloxane of the AB type is prepared in the presence of n-butyllithium; $R_1=R_2=R_3=C_3H_7$; R is $CH_3$, $C_6H_5$ (5:1); $K=n-C_4H_9$, K' is $CH_3$, c is about 600; d is about 15.

Into a glass reactor set under vacuum of $10^{-3}$ mm Hg there is added in vacuum a weighed portion of 250.0 g (1.37 mole) of vinyltripropylsilane and 0.0154 g ($2.4\times10^{-4}$ mole) of n-butyllithium. The reactor is sealed-off from the source of vacuum and placed into a thermostat at a temperature of 40° C. Polymerization of block A is conducted under stirring for 15 hours. Conversion of vinyltripropylsilane is 20.([$\eta$]$=0.54$ dl/g; $\overline{M}_v=190,000$). Thereafter to the resulting "living" chains of polyvinyltripropylsilane there is added 1.0 g (0.0035 mole) of 1-phenyl-1,3,3,5,5-pentamethylcyclotrisiloxane in 15 ml of xylene and 30 ml of tetrahydrofuran; polymerization is conducted at a temperature of 60° C. for one hour. The block-copolymer is recovered following the procedure of Example 1. Intrinsic viscosity of the resulting block is 0.55 dl/g.

| Composition of the block-copolymer: | |
|---|---|
| polyvinyltripropylsilane block | 99% by weight |
| polymethylphenylsiloxane block | 1% by weight. |

What is claimed is:

1. Block-copolymers of vinyltrialkylsilane-hexaorganocyclotrisiloxane of the formula:

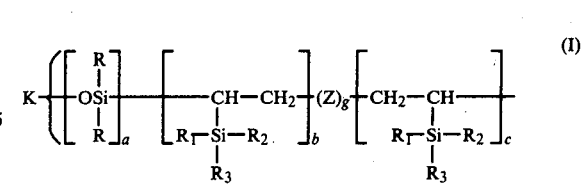

wherein R, R' are compounds selected from the group consisting of methyl and phenyl, $R_1$, $R_2$, $R_3$ are each an aliphatic radical containing 1 to 4 carbon atoms, Z is a residue of a dilithium initiator of polymerization of the vinyltrialkylsilane; K is a residue of a monolithium initiator which is a normal or isoalkyl hydrocarbon radical; K' is a compound selected from the group consisting of hydrogen, $(R)_3Si$ silcarbonic group wherein R is a $C_1-C_4$ alkyl radical, or a hydrocarbon radical; a=0 to $10^4$; b=0 to $10^4$; c=10 to $10^4$; d=10 to $10^4$; f=0 to 1; g=1; x is at least 1, with a molecular mass of from $10^3$ to $10^6$.

2. Block-copolymers of vinyltrialkylsilane-hexaorganotrisiloxane as claimed in claim 1 having the following structural formula:

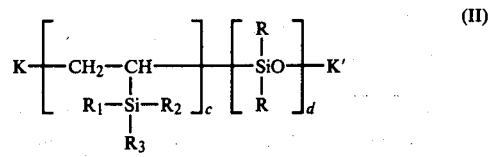

wherein R, $R_1$, $R_2$, $R_3$, c and d are as identified in formula (I) hereinabove, K is a residue of a monolithium initiator which is a hydrocarbon radical selected from the group consisting of a normal alkyl and an iso-alkyl; K' is a compound selected from the group consisting of hydrogen, a $(R)_3Si$ silcarbonic group wherein R is a $C_1-C_4$ alkyl radical, or a hydrocarbon radical.

3. Block-copolymers of vinyltrialkylsilane-hexaorganocyclotrisiloxane as claimed in claim 1 having the following structural formula:

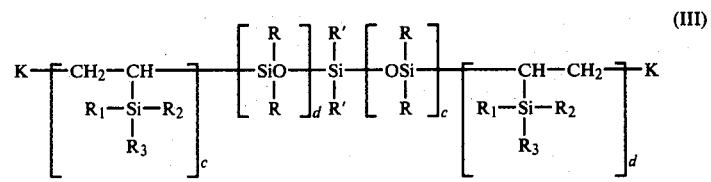

wherein R, R', $R_1$, $R_2$, $R_3$ are as identified above in formula (I), c=d=10 to 1,500; K is a compound selected from the group consisting of a normal alkyl or isoalkyl hydrocarbon radical.

4. Block-copolymers of vinyltrialkylsilane-hexaorganocyclotrisiloxane as claimed in claim 1 having the following structural formula:

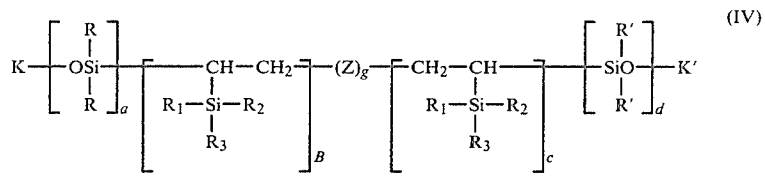

wherein R, $R_1$, $R_2$, $R_3$, c and d are as identified in formula (I), $a = 10$ to $10^4$, $b = 10$ to $10^4$; $g = 1$; K' is a compound selected from the group consisting of hydrogen, a $(R)_3Si$ silcarbonic group, wherein R is a $C_1$-$C_4$ alkyl radical, or a hydrocarbon radical.

5. Block-copolymers of vinyltrialkylsilane-hexaorganocyclotrisiloxane as claimed in claim 1 having the following structural formula:

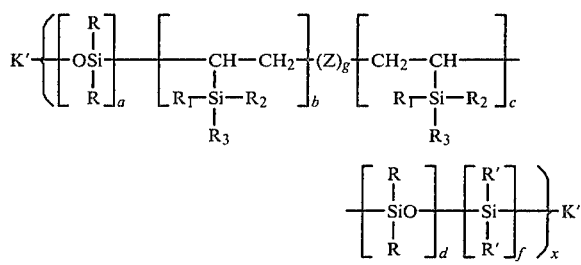

wherein R, R', $R_1$, $R_2$, $R_3$, K' are as identified above in formula (I), $a = 10$ to 1,500; $b = 10$ to 1,500; $c = 10$ to 1,500; $d = 10$ to 1,500; $g = 1$, $f = 1$, x is above 1.

6. A method for preparing block-copolymers of vinyltrialkylsilane-hexaorganocyclotrisiloxane as claimed in claim 1, comprising polymerization of the vinyltrialkylsilane in bulk or in a medium of a hydrocarbon solvent at a temperature within the range of from 0° to 80° C. in vacuum or in the atmosphere of an inert gas in the presence of a compound selected from the group consisting of a mono- and dilithiumorganic initiator, followed by the addition of a hexaorganocyclotrisiloxane in a donor solvent to the reaction mass and a subsequent polymerization at a temperature within the range of from 20° to 60° C. in vacuum or in the atmosphere of an inert gas, stopping said polymerization and recovery of the final block-copolymer of formula (I).

7. A method for preparing block-copolymers of vinyltrialkylsilane-hexaorganocyclotrisiloxane as claimed in claim 1, comprising polymerization of the vinyltrialkylsilane in bulk or in a medium of a hydrocarbon solvent at a temperature within the range of from 0° to 80° C. in vacuum or in the atmosphere of an inert gas in the presence of a compound selected from the group consisting of a mono- and dilithiumorganic initiator, followed by the addition of the hexaorganocyclotrisiloxane in a donor solvent to the reaction mass and polymerization at a temperature within the range of from 20° to 60° C. in vacuum or in the atmosphere of an inert gas, with a subsequent treatment of the resulting intermediate block-copolymer with a compound of the formula $(R)_2SiX_2$, wherein R is methyl, phenyl, X is chlorine, acetoxy; and separation of the final block-copolymer of formula (I).

8. A method for preparing a block-copolymer as claimed in claim 6, wherein first performed is polymerization of vinyltrialkylsilanes in the presence of monolithium initiators in bulk or in a medium of a hydrocarbon solvent, then a solution of a hexaorganocyclotrisiloxane in a donor solvent is added to the reaction mass and polymerization of the second monomer is performed which is stopped and the final block-copolymer of the structural formula (II) is recovered.

9. A method for preparing block-copolymers as claimed in claim 7, wherein combination of the intermediate block-copolymers resulting from polymerization of the second monomer is effected by means of a cross-linking agent of the formula $R_2SiX_2$, wherein R is methyl, phenyl, X is chlorine, or an acetoxy group.

10. A method for preparing block-copolymers as claimed in claim 6, wherein first effected is polymerization of vinyltrialkylsilanes in the presence of a compound selected from the group consisting of metallic lithium and dilithiumorganic compounds in bulk or in a medium of a hydrocarbon solvent, followed by the addition of a solution of a hexaorganocyclotrisiloxane in a donor solvent and polymerization of the second monomer is conducted to give an intermediate block-copolymer, whereafter the polymerization is stopped and the resulting block-copolymer of the structural formula (IV) is recovered.

11. A method for preparing block-copolymers as claimed in claim 7, wherein combination of the intermediate block-copolymers resulting from the production of block-copolymers of the structural formula (IV) is effected by means of a cross-linking agent of the formula $(R)_2SiX_2$, wherein R is methyl, phenyl; X is chlorine, acetoxy.

* * * * *